US009648865B2

(12) United States Patent
Lyon

(10) Patent No.: US 9,648,865 B2
(45) Date of Patent: May 16, 2017

(54) CHONDRICHTHYAN REPELLING SYSTEM

(71) Applicant: SEACHANGE TECHNOLOGY HOLDINGS PTY LTD, Joondalup (AU)

(72) Inventor: Lindsay Lyon, Joondalup (AU)

(73) Assignee: SEACHANGE TECHNOLOGY HOLDINGS PTY LTD, Joondalup (AT)

( * ) Notice: Subject to any disclaimer, the term of this patent is extended or adjusted under 35 U.S.C. 154(b) by 0 days.

(21) Appl. No.: 14/893,437

(22) PCT Filed: May 30, 2014

(86) PCT No.: PCT/AU2014/000563
§ 371 (c)(1),
(2) Date: Nov. 23, 2015

(87) PCT Pub. No.: WO2014/190385
PCT Pub. Date: Dec. 4, 2014

(65) Prior Publication Data
US 2016/0128316 A1 May 12, 2016

(30) Foreign Application Priority Data

May 30, 2013 (AU) ................................ 2013901929

(51) Int. Cl.
*A01M 29/24* (2011.01)
*B63C 9/00* (2006.01)
(Continued)

(52) U.S. Cl.
CPC ............. *A01M 29/24* (2013.01); *A01K 79/02* (2013.01); *B63C 9/00* (2013.01); *H05C 1/04* (2013.01); *B63C 2009/0088* (2013.01)

(58) Field of Classification Search
CPC ....... A01M 29/24; A01K 79/02; A01K 61/00; H05C 1/00; B63B 9/00; B63C 9/00; B63C 9/05
(Continued)

(56) References Cited

U.S. PATENT DOCUMENTS

| 5,566,643 A | 10/1996 | Charter et al. ................ 119/220 |
| 2006/0016379 A1 | 1/2006 | Wescombe-Down .... 114/221 R |
| 2011/0290190 A1 | 12/2011 | Becker .......................... 119/220 |

FOREIGN PATENT DOCUMENTS

| AU | 669806 | 6/1996 |
| WO | WO 03/011025 | 2/2003 |

(Continued)

OTHER PUBLICATIONS

The Notification of Transmittal of the International Search Report and the Written Opinion of the International Searching Authority, or the Declaration, in English, dated Jul. 1, 2014, and the International Search Report, in English, dated Jul. 1, 2014, and the Written Opinion of the International Searching Authority, in English, dated Jul. 1, 2014, from the International Searching Authority of WIPO. This document relates to Applicant's corresponding international (PCT) application having Serial No. PCT/AU2014/000563, filed on May 30, 2014.

*Primary Examiner* — Lars A Olson
(74) *Attorney, Agent, or Firm* — Bodner & O'Rourke, LLP; Gerald T. Bodner; Christian P. Bodner

(57) ABSTRACT

Described is a chondrichthyan repelling system comprising at least one fin comprising at least one electrically conductive electrode for connection to an electrical signal generator. In use, the electrical signal generator generates electrical signals to the at least one electrode to thereby radiate an electrical field which repels chondrichthyans. Also disclosed are various fin designs incorporating one or more electrodes, and a watercraft having one or more fins as described.

(Continued)

Various means of connecting the electrodes to the electrical signal generator are also described.

19 Claims, 13 Drawing Sheets

(51) Int. Cl.
  *A01K 79/02* (2006.01)
  *H05C 1/04* (2006.01)
(58) Field of Classification Search
  USPC ............... 114/221 R; 119/220, 219; 441/79
  See application file for complete search history.

(56) References Cited

FOREIGN PATENT DOCUMENTS

| | | |
|---|---|---|
| WO | WO 03/026410 | 4/2003 |
| WO | WO 03/094370 | 11/2003 |

CHONDRICHTHYAN REPELLING SYSTEM

PRIORITY

The present application claims priority from:
Australian Provisional Patent Application No. 2013901929 titled "A CHONDRICHTHYAN REPELLING SYSTEM", filed on 30 May 2013.

The content of this application is hereby incorporated by reference in its entirety.

INCORPORATION BY REFERENCE

The following publications are referred to in the present application and their contents are hereby incorporated by reference in their entirety:

U.S. Pat. No. 5,566,643 titled "Control of Sharks" (also published as Australian Patent No. 669806) assigned to Natal Sharks Board.

TECHNICAL FIELD

The present application relates to a chondrichthyan repelling system using electrical fields generated by an electrical signal generator.

BACKGROUND

Recorded shark attacks have steadily increased in recent times, while at the same time the desire to offer conservation and protection to sharks has also increased as populations dwindle significantly.

It is known that all chondrichthyans such as predatory sharks have highly sensitive electrical receptors called the "Ampullae of Lorenzini" located in their snouts. These tiny gel filled sacs sense electrical current from prey, but only at very close distances, typically less than one meter.

Conventional shark repelling devices are arranged to generate a localised electrical field that causes the ampullae to spasm and consequently the shark to move away from the generated field.

A typical such conventional device includes a 2.2 m trailing antenna provided with two electrical contacts in electrical communication with the surrounding water, and an electric field generator arranged to generate an electric field across the contacts of sufficient intensity to produce the desired effect to the ampullae of a shark that is sufficiently close to the antenna.

However, this type of shark repelling device tends to generate drag during use of the surfboard, which inhibits performance of the surfboard.

SUMMARY

According to a first aspect, there is provided a fin for use in a chondrichthyan repelling system, wherein at least a portion of the fin is an electrically conductive electrode for electrical connection to a first terminal of an electric signal generator for generating an electric field about the fin that repels chondrichthyans.

In one embodiment, the entire fin is the electrically conductive electrode.

In another embodiment, the entire surface of the fin is the electrically conductive electrode.

In one embodiment, the fin comprises an electrically conductive core comprising a sheet of electrically conductive material between two outer electrically non-conductive portions, at least one of the outer electrically non-conductive portions having at least one aperture therein to expose a portion of the electrically conductive core to thereby provide the at least one electrically conductive electrode.

In one embodiment, the at least one of the outer electrically non-conductive portions has three apertures, thereby exposing three regions of the electrically conductive core.

In one embodiment, the fin further comprises a second electrically conductive electrode for electrical connection to a second terminal of the electric signal generator for generating, in use, the electric field about the fin.

In one embodiment, the fin further comprises at least a first fin electrical connector electrically connected to the at least one electrically conductive electrode and accessible from external to the fin.

In one embodiment, the fin further comprises a second fin electrical connector connected to a second electrically conductive electrode.

In one embodiment, the fin further comprises at least one fin connector for connecting the fin to a watercraft.

In one embodiment, the fin further comprises at least one electrically non-conductive base portion supporting the at least one electrically conductive electrode.

In one embodiment, the fin further comprises a second electrically conductive electrode supported by the electrically non-conductive base portion.

According to a second aspect, there is provided a plug for connecting a fin according to the first aspect, to the body of a watercraft, the plug comprising:

a plug connector for engaging with a fin connector to thereby connect the fin to the body of the watercraft;

a fixing element for fixing the connected fin to the body of the watercraft; and at least one plug first electrical connector for providing an electrical connection between a first terminal of an electrical signal generator and the at least one electrically conductive electrode of the fin.

In one embodiment, the at least one plug first electrical connector is provided by the fixing element.

In one embodiment, the plug further comprises a plug second electrical connector for providing an electrical connection between a second terminal of the electrical signal generator and the second electrically conductive electrode of the fin.

According to a third aspect, there is provided a chondrichthyan repelling system comprising:

at least one fin according to the first aspect, for connection to a watercraft; and an electrical signal generator for connection to the at least one electrically conductive electrode of the at least one fin.

In one embodiment, the chondrichthyan repelling system further comprises at least one plug according to the second aspect.

According to a fourth aspect, there is provided a watercraft comprising:

a watercraft body; and at least one fin according to the first aspect.

In one embodiment, the at least one fin is connected to the watercraft body by at least one plug according to the second aspect.

In one embodiment, the watercraft further comprises an electric signal generator connected to the at least one electrically conductive electrode of the at least one fin via a respective at least one plug member.

In one embodiment, the watercraft comprises two fins according to the first aspect.

In one embodiment, the watercraft comprises three fins according to the first aspect.

In one embodiment, the watercraft is a surfboard and the electrical signal generator is housed within a kicker of the surfboard.

In one embodiment, the kicker comprises a fold-back flap for allowing access to the electrical signal generator within the kicker.

In one embodiment, the watercraft further comprises a grip pad and wherein at least one of a first signal generator connector and a second signal generator electrical connector is located beneath the grip pad.

In one embodiment, the watercraft further comprises a grip pad and at least one of a first signal generator connector and a second signal generator electrical connector is incorporated within the grip pad.

According to a fifth aspect, there is provided a kicker for a surfboard, the kicker comprising a cavity for receiving an electrical signal generator.

According to a sixth aspect, there is provided a grip pad for a surfboard, the grip pad comprising one or more electrical conductors.

According to a seventh aspect, there is provided a chondrichthyan repelling system for repelling chondrichthyans from a watercraft having at least one fin, the repelling system comprising an electrical signal generator for connection to at least two electrodes and for generating electrical signals to cause the at least two electrodes to generate an electric field therebetween to, in use, repel the chondrichthyans, wherein at least one of the electrodes is provided by at least a portion of the at least one fin of the watercraft.

BRIEF DESCRIPTION OF DRAWINGS

Various embodiments will be described with reference to the accompanying drawings wherein.

DESCRIPTION OF EMBODIMENTS

Figure 1:
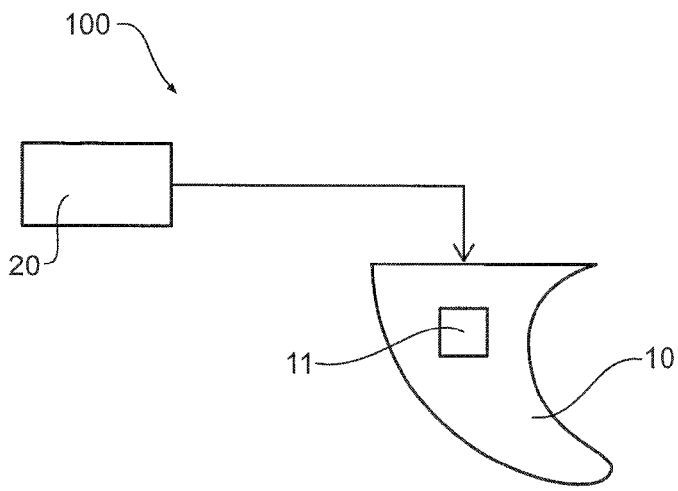
FIG. 1—shows one embodiment of a chondrichthyan repelling system according to one aspect.

Referring now to FIG. 1, there is shown a chondrichthyan repelling system 100 according to one aspect described herein. At a broad level, the chondrichthyan repelling system 100 comprises at least one fin 10 for attachment to a watercraft (not shown). The fin 10 comprises at least one electrically conductive electrode 11. The repelling system 100 also comprises an electrical signal generator 20 for electrical connection to the electrode 11 of the fin 10 and for generating electrical signals that will cause electrode 11 to radiate an electric field that will in use, repel chondrichthyans as previously described.

Figure 2:
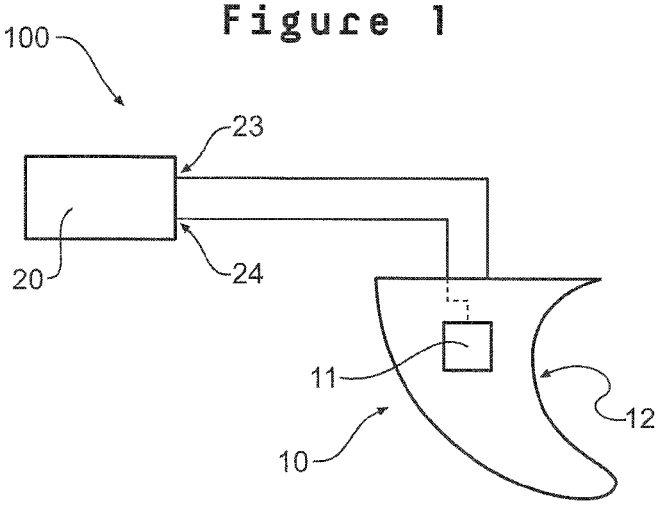
FIG. 2—shows another embodiment of a chondrichthyan repelling system.

It will be understood that numerous variations of this broad arrangement are possible. In one embodiment, the repelling system 100 comprises a fin 10 comprising two electrodes being first electrode 11 and second electrode 12. Each electrode 11 and 12 is in use, electrically connected to a respective first terminal 23 and second terminal 24 of electric signal generator 20. In one such embodiment, the electrodes 11 and 12 are disposed on opposite sides of the fin 10 as shown in FIG. 2 (electrode 12 is not visible in this view, being on the right side of the fin 10). In this embodiment, the repelling electric field is able to be generated using a single fin.

Figure 3:
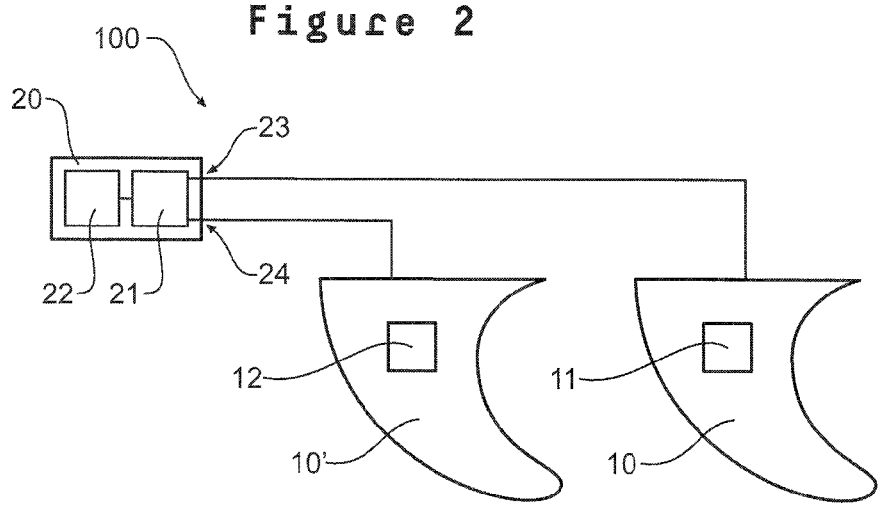
FIG. 3—shows another embodiment of a chondrichthyan repelling system.

In another embodiment as shown in FIG. 3, repelling system 100 comprises two fins 10 and 10', with fin 10 comprising first electrode 11 and fin 10' comprising second electrode 12. In this embodiment, the first electrode 11 of fin 10 is connected to the first output terminal 23 of signal generator 20 and the second electrode 12 of fin 10' is connected to the second output terminal 24 of signal generator 20. In this view, signal generator 20 is shown to comprise a pulse generator 21 and a battery 22 for powering the pulse generator. The function of the pulse generator 21 will be described in more detail below.

Figure 4:
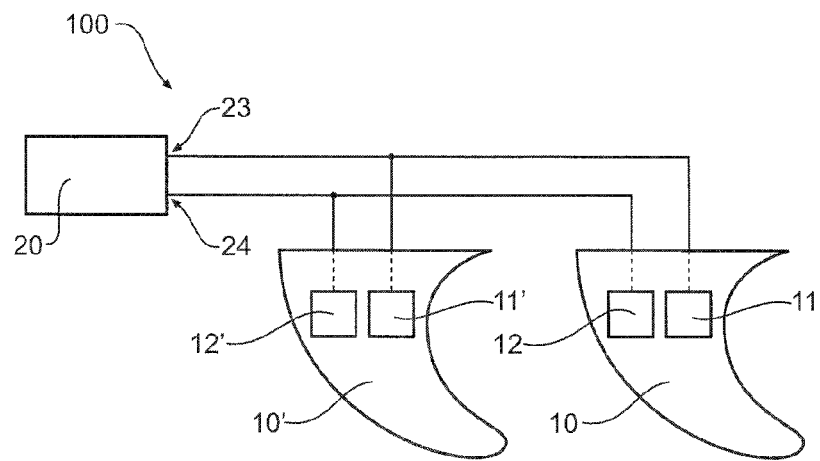
FIG. 4—shows another embodiment of a chondrichthyan repelling system.

In another embodiment as shown in FIG. 4, repelling system 100 comprises the signal generator 20 with two fins 10, 10' with each fin comprising two electrodes. Fin 10 has first electrode 11 and second electrode 12 and the second fin 10' has first electrode 11' and second electrode 12'. In this arrangement, each of the first electrodes 11, 11' is connected to the first output terminal 23 of signal generator 20 and each of the second electrodes 12, 12' is connected to the second output terminal 24 of the signal generator 20.

Figure 5:
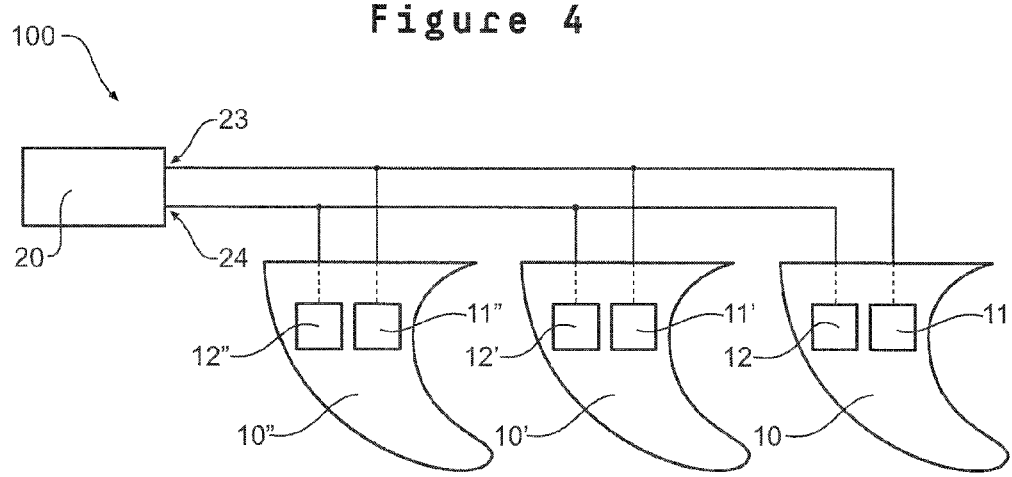
FIG. 5—shows another embodiment of a chondrichthyan repelling system.

In another embodiment as shown in FIG. 5, repelling system 100 comprises three fins 10, 10' and 10", with each fin comprising two electrodes 11, 12; 11',12' and 11",12" respectively. Each of the first electrodes 11, 11' and 11" is connected to the first output terminal 23 of signal generator 20 and each of the second electrodes 12, 12' and 12" is connected to the second output terminal 24 of the signal generator 20.

Figure 6:
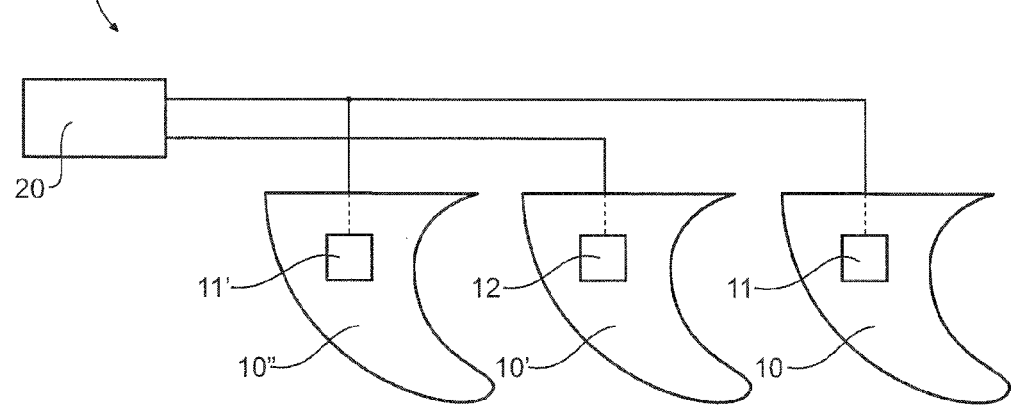
FIG. 6—shows another embodiment of a chondrichthyan repelling system.

In yet another embodiment, repelling system 100 comprises three fins 10, 10' and 10" but in this embodiment, each fin has only one electrode. In the arrangement shown in FIG. 6, two of the fins 10 and 10" has a first electrode 11 and 11', each connected to the first output terminal 23 of signal generator 20, while fin 10' has a second electrode 12, connected to the second output terminal 24 of signal generator 20.

Any other suitable combinations are also possible, including the use of 4, 5, 6, 7, 8, 9 and 10 or more fins. In some embodiments, one or more of these fins will have one electrode and in other embodiments, one or more of these fins will have two electrodes. In other embodiments still, one or more fins will have 3, 4, 5, 6, 7, 8, 9, 10 or more electrodes. Any combination of the above is also possible.

In another aspect, the repelling system 100 is applied to a watercraft, to provide a chondrichthyan repelling field around the watercraft. The repelling system 100 is applicable to any watercraft which has one or more fins, or to which one or more fins may be attached. The various embodiments described herein are described in the context of the watercraft being a surfboard, however any other watercraft such as a canoe, kayak, raft, boat, ship, ski board or other watercraft (even if they do not ordinarily have a fin) can equally benefit from the various aspects described herein.

Figure 7:
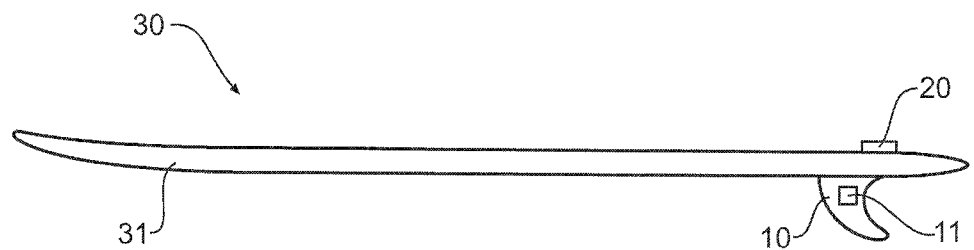
FIG. 7—shows an embodiment of a chondrichthyan repelling system applied to a watercraft.

FIG. 7 shows a general arrangement of a watercraft, in this embodiment, being a surfboard 30. Repelling system 100 is applied to the surfboard 30 as shown. In this embodiment, fin 10 is attached to the body 31 of surfboard 30 by any suitable means (some examples of which will be described in more detail below). Fin 10 supports at least first conductor 11 as previously described. In some embodiments, fin 10 is already incorporated into the surfboard 30 and is not detachable. Electrode 11 will then be applied to fin 10 by any suitable means.

Signal generator 20 is mounted to or in relation to, surfboard 30 by any suitable means, examples of which will be described in more detail below.

Figure 8A:
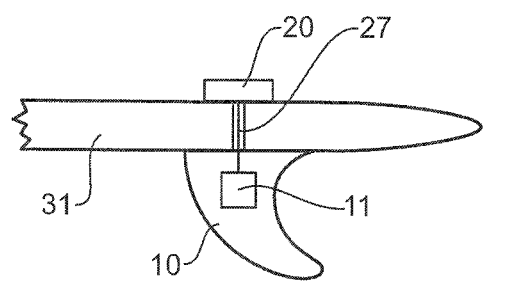
FIG. 8A—shows one embodiment for connecting an electrode to the electrical signal generator.
Figure 8B:
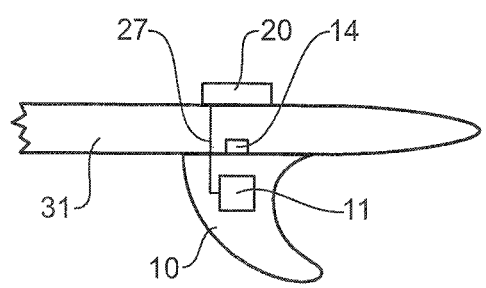
FIG. 8B—shows another embodiment for connecting an electrode to the electrical signal generator.
Figure 8C:
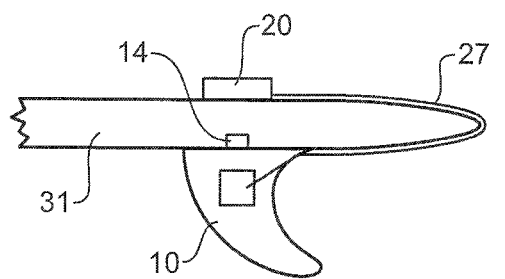
FIG. 8C—shows another embodiment for connecting an electrode to the electrical signal generator.
Figure 8D:
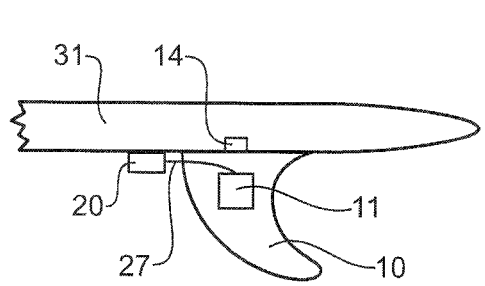
FIG. 8D—shows another embodiment for connecting an electrode to the electrical signal generator.

FIGS. 8A to 8D show different embodiments of connecting the electrodes (illustrated using first electrode 11) to signal generator 20. In FIG. 8A, signal generator 20 is located above the body 31 of surfboard 30 and fin 10 is located below the body 31 and under signal generator 20. In this arrangement an aperture or hole is provided through the body 31 through which an electrical connector 27 is provided to connect first electrode 11 to the signal generator. In FIG. 8B, fin 10 is attached to body 31 via a fin connector 14 (described in more detail below), and electrical connector 27 passes through a different region of the body 31. In FIG. 8C, electrical connector 27 does not pass through the body 31 of the surfboard 30, but rather runs along its surface to connect first electrode 11 to signal generator 20. In FIG. 8D, signal generator 20 is located underneath body 31 and connected to first electrode 11 via electrical connector 27 underneath the body 31. In this arrangement, a suitable cover can be provided over signal generator 20 to reduce any detrimental hydrodynamic effects of having the signal generator 20 located underneath the body 31.

Figure 9:
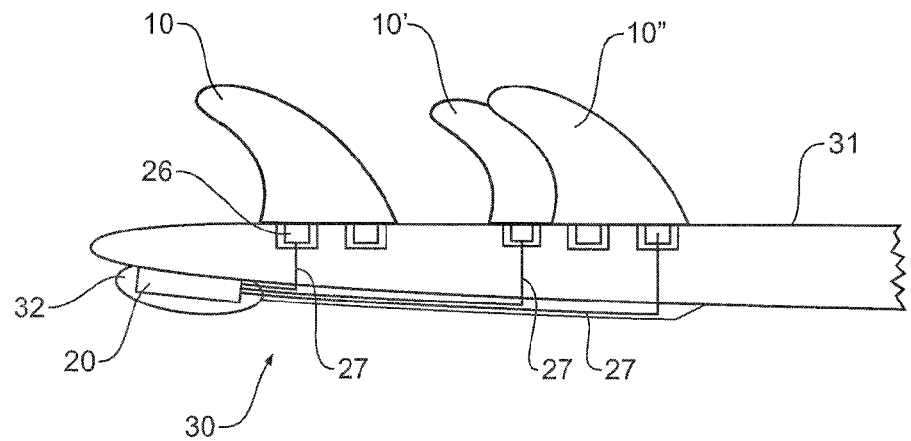
FIG. 9—shows an embodiment of a repelling system applied to a surfboard with three fins.

FIG. 9 shows an embodiment of watercraft or surfboard 30 with three fins 10, 10' and 10", connected to signal generator 20 (housed within a waterproof housing 32), and connected to respective electrodes (not visible in this view) by electrical connectors 27.

Figure 10:
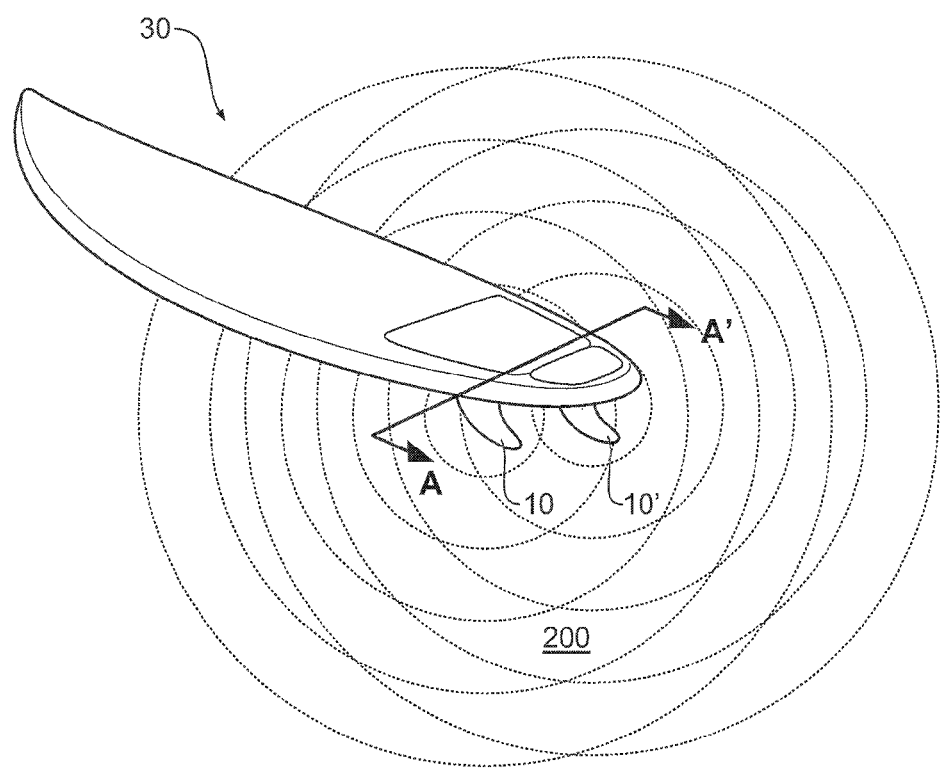
FIG. 10—shows a representation of an electric field generated about a surfboard with the repelling system.

FIG. 10 shows another embodiment of surfboard 30 with two fins 10 and 10' and shows a representation of the electric field 200 generated between the two electrodes (not visible in this view) on the fins 10 and 10', with the water surrounding the fins 10 and 10' acting as the conductive medium, when in use.

Figure 11:
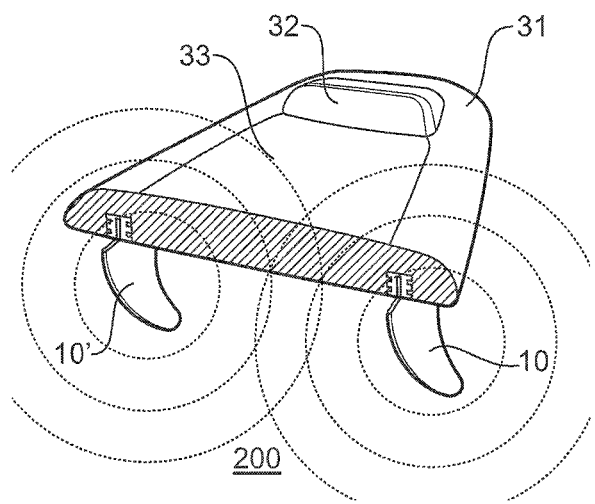
FIG. 11—shows a cross sectional view of the arrangement of FIG. 10.

FIG. 11 shows a cross section of the surfboard 30 of FIG. 10 along the lines A-A', showing the connection of the fins 10 and 10' to the body 31 of surfboard 30. Also shown is kicker 32 acting as the housing for signal generator 20 and grip pad 33 which can be used to cover or incorporate the electrical connectors 27 to connect signal generator 20 to the electrodes on the fins as described above.

Figure 12:
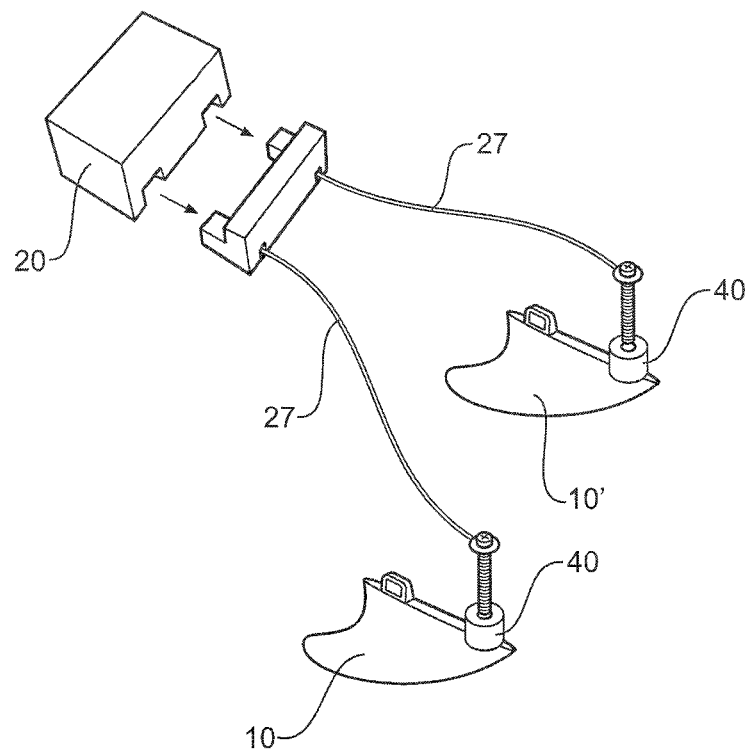
FIG. 12—shows a specific example of a repelling system with two fins and plugs.

FIG. 12 shows an example embodiment of a specific implementation for connection of fins 10 and 10' to respective terminals of the signal generator 20. In this example, fins 10 and 10' are connected via electrical connectors 27 and via a conductive path provided by fin plugs 40 as will be described in more detail further below.

Figure 13:
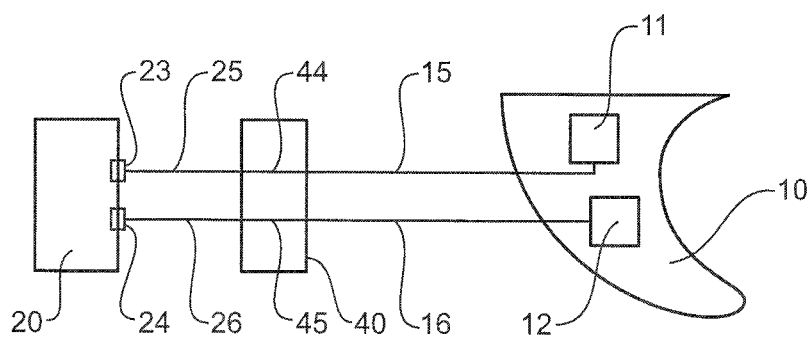
FIG. 13—shows an embodiment of the electrical connectors between the electrodes and the signal generator.

FIG. 13 shows a more detailed arrangement of an embodiment of connecting the electrodes to the signal generator 20. In this embodiment, electrical connector 27 described previously, is provided by three different electrical connectors along the path from the signal generator 20 to the electrode 11 or 12.

As seen in FIG. 13, first electrode 11 on fin 10 is connected to signal generator 20 via first signal generator electrical connector 25, connected to first output terminal 23 of the signal generator 20 and via first plug electrical connector 44 provided by a conductive element within plug 40, and via first fin electrical connector 15 associated with or incorporated within fin 10.

Second electrode 12 on fin 10 is connected to signal generator 20 via second signal generator electrical connector 26, connected to second output terminal 24 of the signal generator 20 and via second plug electrical connector 45 provided by a conductive element within plug 40, and via second fin electrical connector 16 associated with or incorporated within fin 10.

Figure 14:
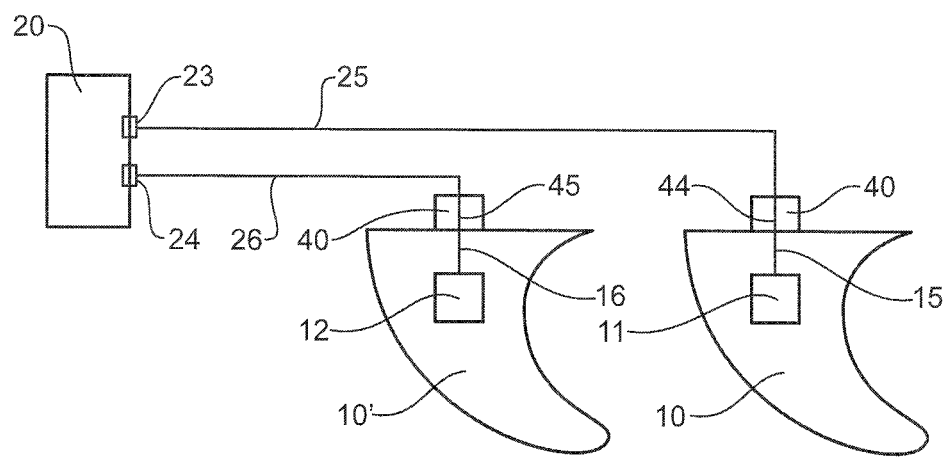
FIG. 14—shows another embodiment of the electrical connectors between the electrodes and the signal generator.

FIG. 14 shows another embodiment with a similar electrical connection arrangement, in which there are two fins 10 and 10', each with a single electrode 11 and 12 respectively. In this arrangement, first electrode 11 on fin 10 is connected to signal generator 20 via first signal generator electrical connector 25, connected to first output terminal 23 of the signal generator 20 and via first plug electrical connector 44 provided by a conductive element within plug 40, and via first fin electrical connector 15 associated with or incorporated within fin 10.

Second electrode 12 on fin 10' is connected to signal generator 20 via second signal generator electrical connector 26, connected to second output terminal 24 of the signal generator 20 and via second plug electrical connector 45 provided by a conductive element within plug 40, and via second fin electrical connector 16 associated with or incorporated within fin 10'.

In other embodiments, there may be no, or only one or two parts to electrical connector 27. For example, where there is no plug 40, there will be no plug electrical connector 44,45. In embodiments where fin connector 14 extends to make direct contact with output terminals 23, 24 of signal generator 20, and is itself a part of the electrode 11 or 12, there may be no separate signal generator electrical connector 25, 26, no separate plug electrical connector and no separate fin electrical connector 15, 16.

In the case where the entire fin 10 acts as the electrode, and is connected to surfboard 30 via plug 40, there may be no separate fin electrical connector.

Figure 15:
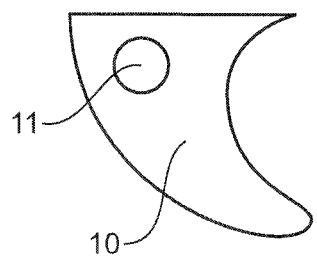
FIG. 15—shows an embodiment of a fin according to an aspect described herein.
Figure 16:
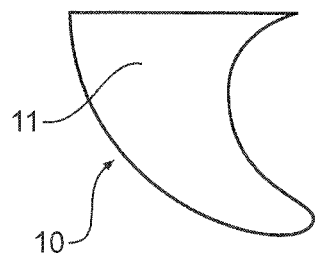
FIG. 16—shows another embodiment of a fin.
Figure 17:
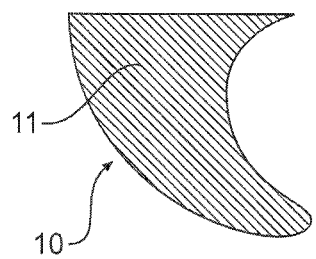
FIG. 17—shows another embodiment of a fin.

According to another aspect described herein, there is provided a fin for use in a chondrichthyan repelling system, wherein at least a portion of the fin is an electrically conductive electrode for electrical connection to a first output terminal of an electrical signal generator for generating an electric field about the fin that repels chondrichthyans. FIG. 15 shows a broad embodiment of this aspect, showing fin 10 with a single electrode 11. In FIG. 16, fin 10 is shown made entirely from an electrically conductive material such as stainless steel or aluminium. In this embodiment, the entire fin 10 acts as the electrode 11. In the embodiment of FIG. 17, the fin 10 has a surface coating or sheet applied to an electrically non-conductive substrate or base portion to thereby provide the fin 10 whose entire surface fours electrode 11.

Figure 18A:
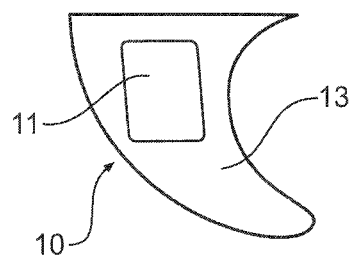
FIG. 18A—shows a left side view another embodiment of a fin.
Figure 18B:
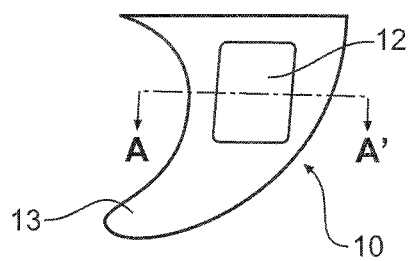
FIG. 18B—shows a right side view of the fin of FIG. 18A.

FIGS. 18A and 18B show opposite sides of the same fin 10, showing that the fin 10 can support two electrodes to generate the electric field from a single fin. In this arrangement, first electrode 11 and second electrode 12 are supported by an electrically non-conductive substrate or base portion 13.

Figure 19:
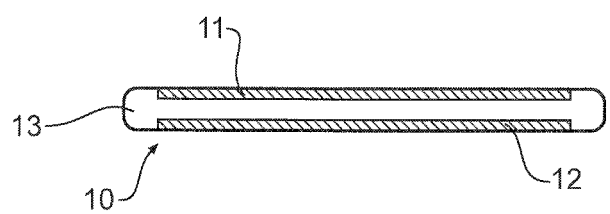
FIG. 19—shows a cross sectional view of the fin of FIGS. 18A and 18B.

FIG. 19 shows a cross sectional view of the fin 10 of FIG. 18B along the line A-A'. As can be seen in this figure, first electrode 11 and second electrode 12 are supported by non-conductive substrate or base portion 13. Substrate or base portion 13 can be made of any suitable material such as fiberglass or plastic, or any suitable composite that may be used to construct surfboards.

Figure 20:
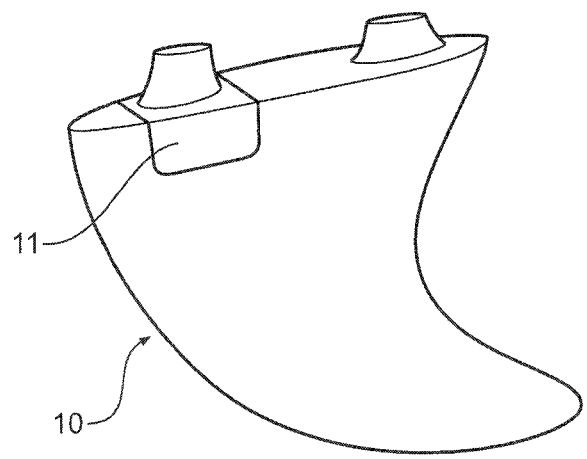
FIG. 20—shows another embodiment of a fin.

Another embodiment of fin 10 is shown in FIG. 20. In this embodiment, a conductive insert is provided for the leading edge fin tab where the grub screw of a plug (see further below) will make contact upon attachment of the fin 10 to the body 31, to thereby provide an electrical connection and provide the electrode 11. In this embodiment, it will be appreciated that the fin connector 14 acts as the first fin electrical connector 15 to provide an electrical connection to the first electrode 11.

Figure 21:
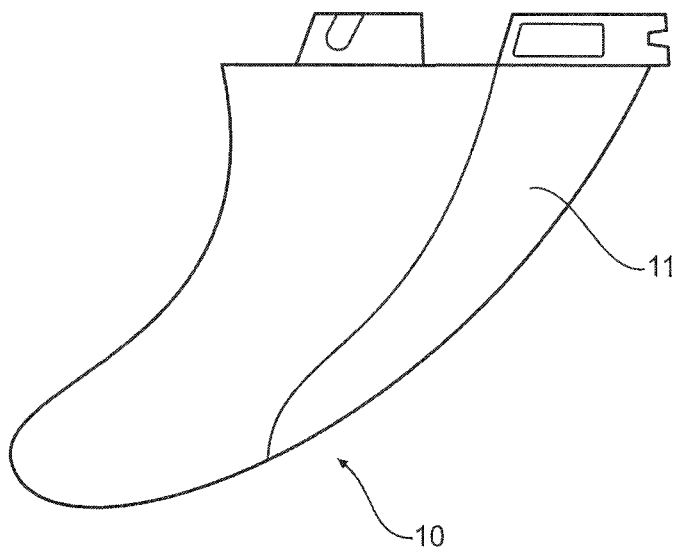
FIG. 21—shows another embodiment of a fin.

FIG. 21 shows yet another embodiment of fin 10 with electrode 11, in which a stainless steel leading edge is blended into the traditionally molded fin 10 to provide electrode 11.

Figure 22:
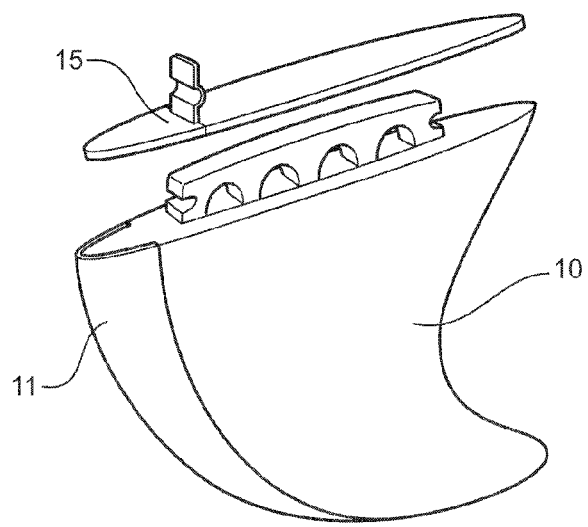
FIG. 22—shows another embodiment of a fin.

In another embodiment of fin 10, as shown in FIG. 22, first fin electrical connector 15 is provided by a metal insert shaped to conform to the shape of an existing fin design, and to receive the grub screw of plug 40 as described further below. When in place, the metal insert makes electrical contact with first electrode 11 at the leading edge of fin 10.

Figures 23A, 23B:
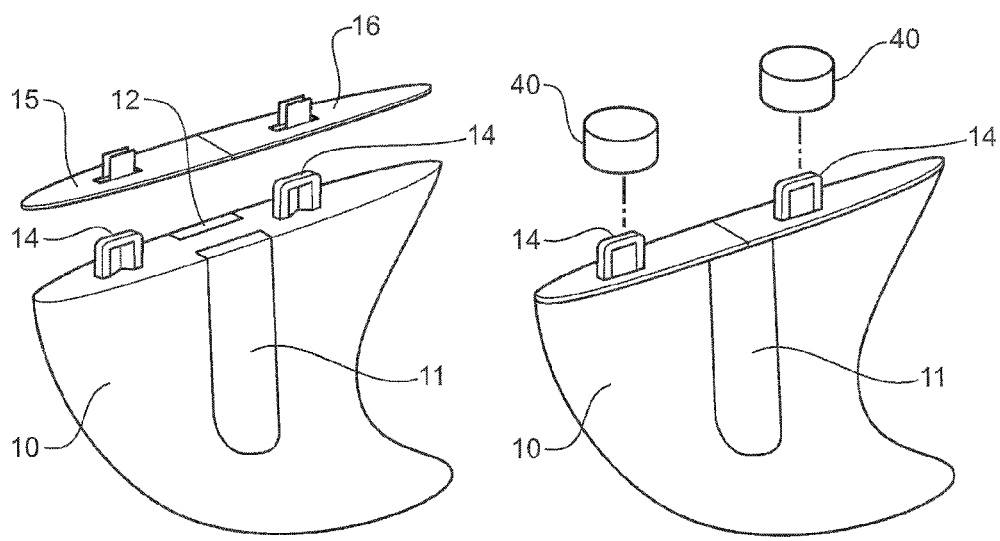
FIG. 23A—shows another embodiment of a fin.
FIG. 23B—shows a completed form of the fin of FIG. 23A.

In another embodiment of fin 10 as shown in FIGS. 23A and 23B, sheets of electrically conductive material with bent tabs to receive the fin connectors 14, are placed on top of the fin 10 to be in electrical contact with first electrode 11 and second electrode 12 to form first fin electrical connector 15 and second fin electrical connector 16. As seen in FIG. 23B, when in place first fin electrical connector 15 and second fin electrical connector 16 are received in plugs 40 to provide an electrical path to the signal generator (not shown) through plugs 40.

Figure 24A:
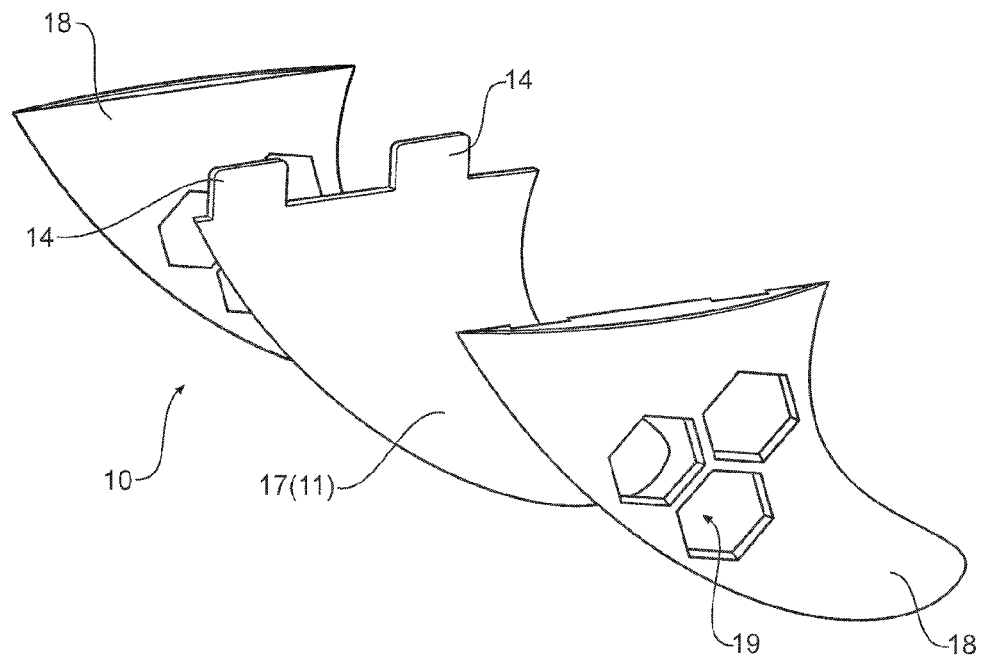
FIG. 24A—shows another embodiment of a fin.
Figure 24B:
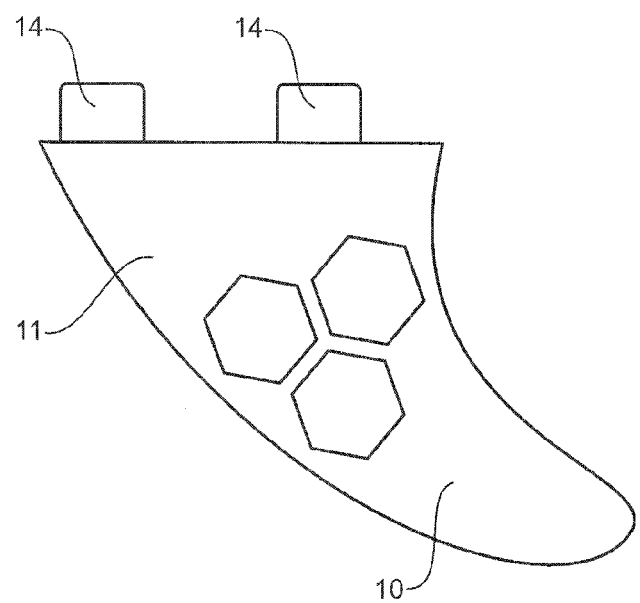
FIG. 24B—shows a completed form of the fin of FIG. 24A.

In yet another embodiment as shown in FIGS. 24A and 24B, fin 10 is constructed with first electrode 11 provided as a flat sheet of electrically conductive material such as stainless steel to provide an electrically conductive core 17, with tabs to provide fin connectors 14 to connect to a fin plug (not shown). Two outer electrically non-conductive portions 18 with at least one aperture 19 cover the core 17. The region of the core 17 under the aperture 19 is exposed to the surrounding water in use, thereby providing electrode 11. The outer electrically non-conductive portions 18 are affixed to the core 17 by any suitable means including gluing or molding.

In some embodiments, there is only one aperture between both electrically non-conductive portions 18. In other embodiments, each electrically non-conductive portion has an aperture, and in other embodiments, each electrically non-conductive portion has 2, 3, 4, 5, 6, 7, 8, 9, 10 or more apertures, or combinations of the above.

The finished fin 10 of this embodiment is shown in FIG. 24B.

In a further embodiment, a fin 10 of the form shown in FIGS. 24A and 24B can be formed in which there are two electrodes 11 and 12 provided by respective electrically conductive sheets forming respective cores. These sheets will be separated by a further non-conductive substrate or base portion 13 with non-conductive portions 18 with respective apertures covering the electrically conductive cores 17. In this arrangement a single fin 10 will have two electrodes, first electrode 11 and second electrode 12.

It will be appreciated that the electrically conductive material used to provide the electrodes can be any suitable material, including metal, stainless steel, aluminium, alloys and other materials such as graphene and carbon fibre.

In the case where fin 10 is detachable from watercraft 30, fin 10 can be attached to watercraft 30 by any suitable means. One common means is to use a plug 40 as previously described. One form of plug 40 is shown schematically in FIG. 25. In this embodiment, plug 40 comprises a plug connector 41 (which could be a slot or a protrusion) for engaging with a fin connector 14 (not shown) (which could also be a reciprocal protrusion or slot) to thereby connect the fin 10 to the body 31 of the watercraft 30. Plug 40 also has a fixing element 42 (not shown) (for example a screw (known as a grub screw) or a pin) for fixing the connected fin to the body 31 of the watercraft 30, and at least one plug first electrical connector 44 for providing an electrical connection between a first terminal of the electrical signal generator (not shown) and the at least one electrically conductive electrode of the fin 10 (not shown). In some embodiments the first plug connector is provided by the fixing element such as the screw or pin. In other embodiments, the first plug connector is provided by an electrically conductive wire 44 as shown in the cutaway portion 43.

Figure 25:
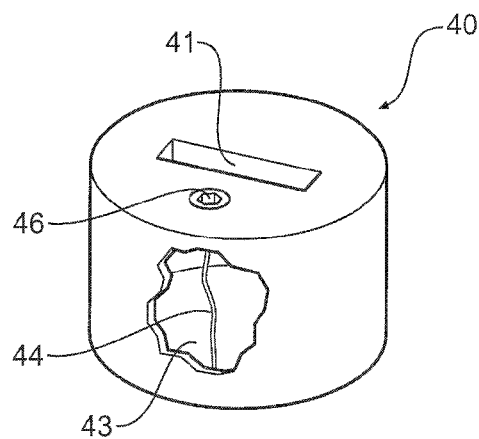
FIG. 25—shows a schematic view of a fin plug.

In the embodiment shown in FIG. 25, fixing element 42 is received in plug fixing aperture 46.

In some embodiments, plug 40 also comprises a second plug electrical connector 45 (not shown in this view) to allow connection to a second electrode 12.

Figure 26:
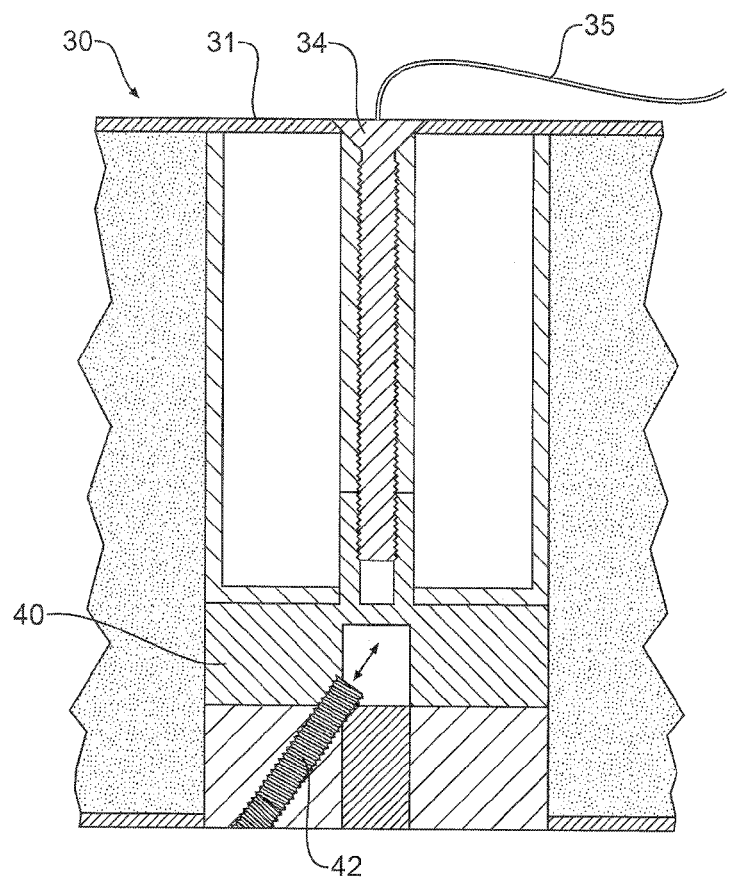
FIG. 26—shows an embodiment of retro-fitting a surfboard to apply the repelling system.

FIG. 26 shows one embodiment of an arrangement for retro-fitting a surfboard 30 with the repelling system described herein. In one embodiment, the fibreglass top deck of the surfboard 30 is pierced above the existing plug 40 to expose a plastic screw that is in place to seal the thread made to receive the plug 40 from the resin of the surfboard body 31. The plastic screw is removed and a conductive screw 34 is inserted into the fin plug thread in which the plastic screw had been screwed. This now forms a conductive pathway from the top of the surfboard to the metal plug 40 and to the grub screw 42 which will itself make electrical contact with the electrode 11 of the fin 10 (not shown) when in place.

An electrically conductive wire 35 can then be attached to the top of the electrically conductive screw 34 to together, form the first or second signal generator electrical connector 25, 26.

Figure 27:
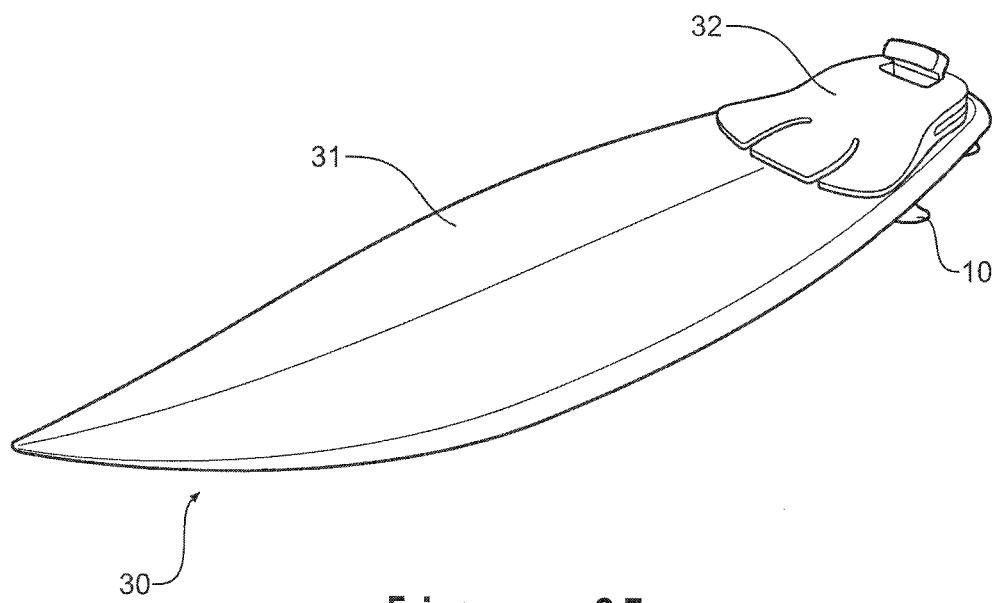
FIG. 27—shows an embodiment of a surfboard with a housing for the signal generator.

FIG. 27 shows an embodiment of a watercraft 30 (in this case a surfboard) comprising a body 31, at least one fin 10 and a housing 32 for the electrical signal generator (not shown). The housing in this embodiment is a kicker, which is provided on a surfboard to provide a footing for the surfer when riding the surfboard.

Figure 28:
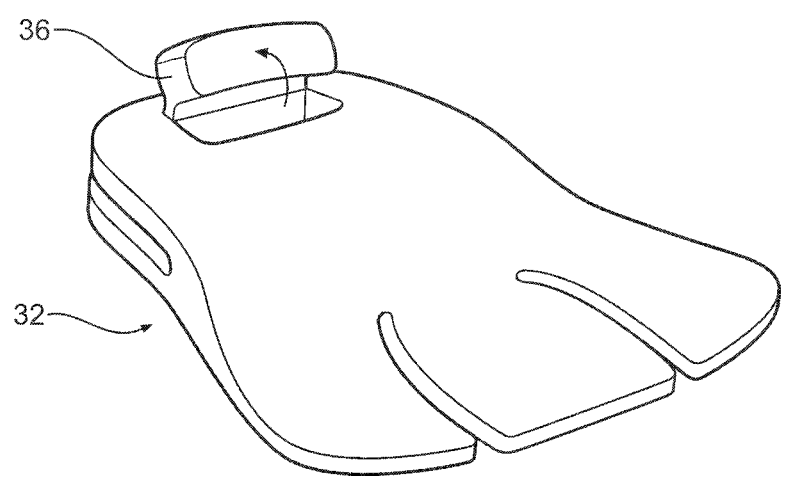
FIG. 28—shows a flap on the housing for accessing the signal generator.

As shown in FIG. 28, a flap 36 is provided to allow access to a cavity within kicker 32 in which the electrical signal generator 20 (not shown) can be housed. The output terminals 23, 24 of electrical signal generator 20 can then be connected to the first and second electrodes 11, 12 on the one or more fins 10 by any suitable means as previously described.

Any suitable electrical signal generator can be used, such that it will generate electrical signals to a first electrode 11 and a second electrode 12 that will radiate an electric field therebetween that will repel chondrichthyans. An example of one such suitable signal generator is described in detail in U.S. Pat. No. 5,566,643 hereby incorporated by reference in its entirety.

In an example of suitable signals generated, the voltage pulses generated may have a duration of between about 0.1 ms and 200 ms, a frequency between about 1 Hz and 60 Hz, a pulse rise time that is less than about 0.001 µs and a voltage magnitude between about 24V and 72V.

In some embodiments, the pulses are produced in pulse trains, with each pulse train comprising several pulses and each pulse having a duration of between about 0.1 ms and 2 ms, a spacing between adjacent pulses in a pulse train of between about 1 ms and 30 ms, and the pulse trains repeating at a period of between about 100 ms and 1000 ms.

Figure 29A:
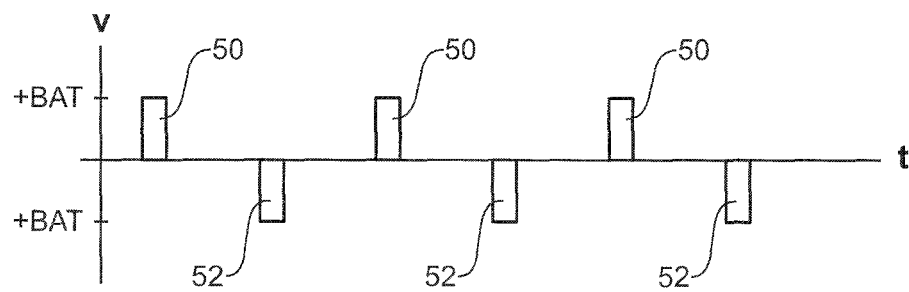
FIG. 29A—shows an example of voltage pulses generated by the signal generator.

Example voltage pulses 50, 52 produced by the electrical signal generator 20 are shown in FIG. 29A. In this example, the pulses are substantially square type with alternating positive and negative pulses 50, 52.

Since the system is often operated during use in sea water that has a lower electrical resistance than fresh water, the signal generator 20 may be arranged to limit the current produced by the signal generator 20 and thereby protect the circuitry of the signal generator 20.

Figure 29B:
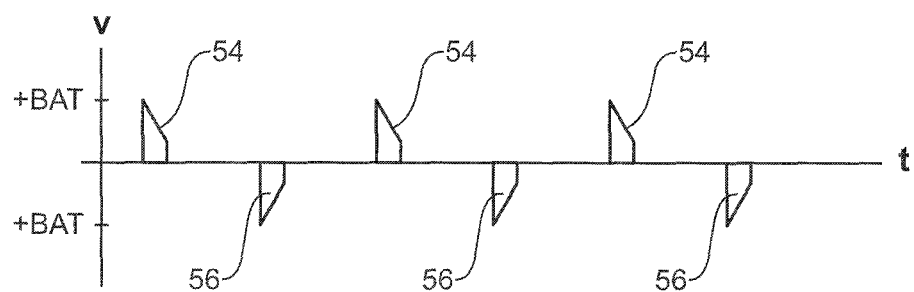
FIG. 29B—shows another example of voltage pulses generated by the signal generator.

Alternative example voltage pulses 54, 56 produced by the signal generator 20 are shown in FIG. 29B. In this example, the pulses are substantially saw tooth shaped. With this arrangement, a lower amount of energy is imparted to the electric field generated in the water than the voltage pulses 50, 52 shown in FIG. 29A.

Figure 29C:
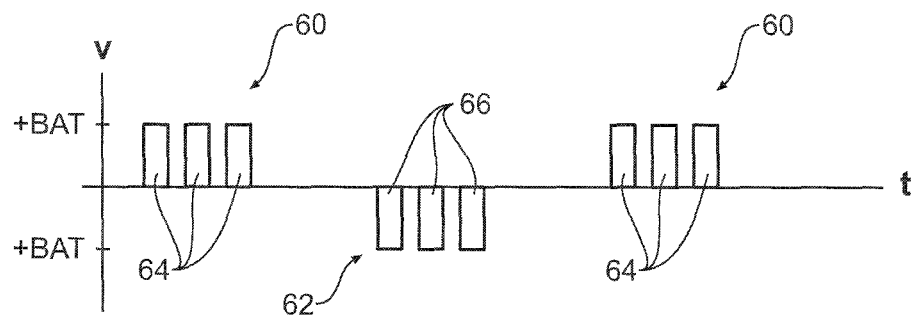
FIG. 29C—shows an example of voltage pulses generated by the signal generator.

In a particular example shown in FIG. 29C, a pulse waveform that includes alternating positive 60 and negative 62 pulse trains is shown. Each pulse train includes 3 substantially square wave pulses 64, 66, each pulse train is repeated every 200 ms. Also, each pulse 64, 66 has a duration of about 0.5 ms, is repeated every 20 ms and has a magnitude of about 48V.

In a broad sense, the above has described a chondrichthyan repelling system for repelling chondrichthyans from a watercraft having at least one fin, the repelling system comprising an electrical signal generator for connection to at least two electrodes and for generating electrical signals to cause the at least two electrodes to generate an electric field therebetween to, in use, repel the chondrichthyans, wherein at least one of the electrodes is provided by at least a portion of the at least one fin of the watercraft.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A fin for use in a chondrichthyan repelling system, wherein at least a portion of the fin is an electrically conductive electrode for electrical connection to a first terminal of an electric signal generator for generating an electric field about the fin that repels chondrichthyans, and wherein the fin further comprises at least a first fin electrical connector electrically connected to the at least one electrically conductive electrode and accessible from external to the fin.

2. A fin as claimed in claim 1 wherein the entire fin is the electrically conductive electrode.

3. A fin as claimed in claim 1 wherein the entire surface of the fin is the electrically conductive electrode.

4. A fin for use in a chondrichthyan repelling system, wherein at least a portion of the fin is an electrically conductive electrode for electrical connection to a first terminal of an electric signal generator for generating an electric field about the fin that repels chondrichthyans and wherein the fin comprises an electrically conductive core comprising a sheet of electrically conductive material between two outer electrically non-conductive portions, at least one of the outer electrically non-conductive portions having at least one aperture therein to expose a portion of the electrically conductive core to thereby provide the at least one electrically conductive electrode.

5. A fin as claimed in claim 4 wherein the at least one of the outer electrically non-conductive portions has three apertures, thereby exposing three regions of the electrically conductive core.

6. A fin as claimed in claim 1 further comprising a second electrically conductive electrode for electrical connection to a second terminal of the electric signal generator for generating, in use, the electric field about the fin.

7. A fin as claimed in claim 1 further comprising a second fin electrical connector connected to a second electrically conductive electrode.

8. A fin as claimed in claim 1 further comprising at least one fin connector for connecting the fin to a watercraft.

9. A fin as claimed in claim 1 further comprising at least one electrically non-conductive base portion supporting the at least one electrically conductive electrode.

10. A fin as claimed in claim 9 further comprising a second electrically conductive electrode supported by the electrically non-conductive base portion.

11. A chondrichthyan repelling system comprising:
    at least one fin as claimed in claim 1, for connection to a watercraft; and
    an electrical signal generator for connection to the at least one electrically conductive electrode of the at least one fin for thereby, in use, generating an electric field about the at least one fin that repels chondrichthyans.

12. A watercraft comprising:
    a watercraft body; and
    at least one fin as claimed in claim 1.

13. A watercraft as claimed in claim 12 further comprising an electric signal generator connected to the at least one electrically conductive electrode of the at least one fin.

14. A watercraft as claimed in claim 12 comprising two fins.

15. A watercraft as claimed in claim 12 comprising three fins.

16. A watercraft as claimed in claim 13 wherein the watercraft is a surfboard and the electrical signal generator is housed within a kicker of the surfboard.

17. A watercraft comprising:
    a watercraft body;
    at least one fin for use in a chondrichthyan repelling system, wherein at least a portion of the fin is an electrically conductive electrode for electrical connection to a first terminal of an electric signal generator for generating an electric field about the fin that repels chondrichthyans, and
    an electric signal generator connected to the at least one electrically conductive electrode of the at least one fin,
    wherein the watercraft is a surfboard and the electrical signal generator is housed within a kicker of the surfboard, and
    wherein the kicker comprises a fold-back flap for allowing access to the electrical signal generator within the kicker.

18. A watercraft comprising:
    a watercraft body;
    at least one fin for use in a chondrichthyan repelling system, wherein at least a portion of the fin is an electrically conductive electrode for electrical connection to a first terminal of an electric signal generator for generating an electric field about the fin that repels chondrichthyans, and
    an electric signal generator connected to the at least one electrically conductive electrode of the at least one fin,
    wherein the watercraft is a surfboard and the electrical signal generator is housed within a kicker of the surfboard,
    wherein the watercraft further comprises a grip pad and wherein at least one of a first signal generator connector and a second signal generator electrical connector is located beneath the grip pad.

19. A watercraft comprising:
    a watercraft body;
    at least one fin for use in a chondrichthyan repelling system, wherein at least a portion of the fin is an electrically conductive electrode for electrical connection to a first terminal of an electric signal generator for generating an electric field about the fin that repels chondrichthyans, and
    an electric signal generator connected to the at least one electrically conductive electrode of the at least one fin,
    wherein the watercraft is a surfboard and the electrical signal generator is housed within a kicker of the surfboard,
    wherein the watercraft further comprises a grip pad and wherein at least one of a first signal generator connector and a second signal generator electrical connector is incorporated within the grip pad.

* * * * *